No. 640,188. Patented Jan. 2, 1900.
H. W. FORCE.
ATTACHMENT FOR STEREOPTICONS, &c.
(Application filed Apr. 16, 1897.)
(No Model.)
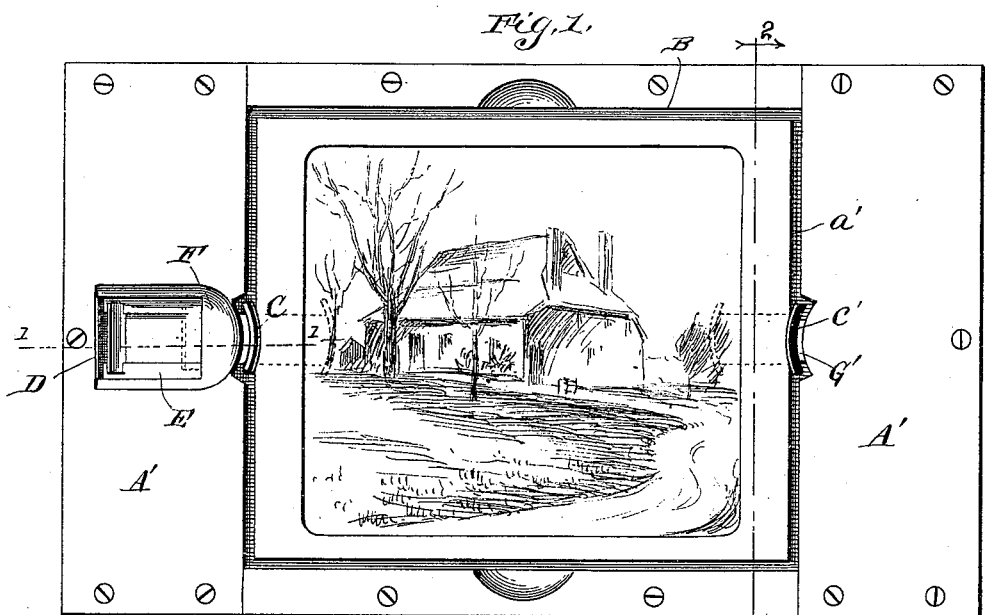
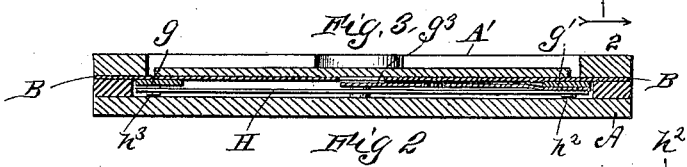
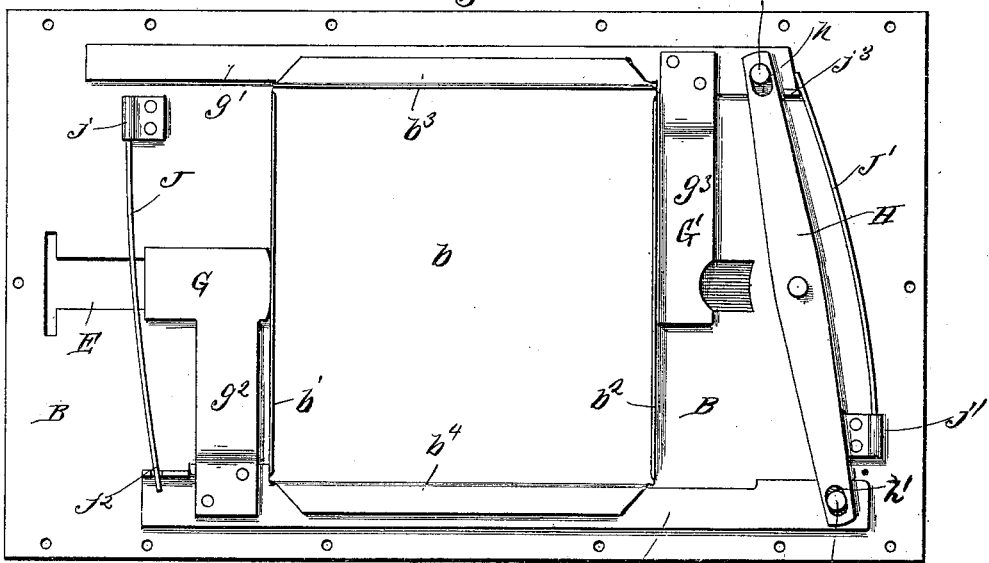
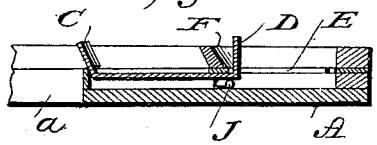
Witnesses: J. R. Mansfield, Graham Fillman
Inventor: Horace W. Force

UNITED STATES PATENT OFFICE.

HORACE W. FORCE, OF NEWBURG, NEW YORK.

ATTACHMENT FOR STEREOPTICONS, &c.

SPECIFICATION forming part of Letters Patent No. 640,188, dated January 2, 1900.

Application filed April 16, 1897. Serial No. 632,487. (No model.)

*To all whom it may concern:*

Be it known that I, HORACE W. FORCE, of Newburg, in the county of Orange and State of New York, have invented certain new and useful Improvements in Attachments for Stereopticons, Magic Lanterns, &c.; and I hereby declare that the following is a full, clear, and exact description thereof, reference being had to the accompanying drawings, which form part of this specification.

This invention is an improvement in slide-holders for stereopticons, magic lanterns, and the like, and has especial reference to the manner of holding lantern-slides of various dimensions while the picture upon the slide is being displayed in an optical instrument, it being more particularly intended for use in double dissolving lanterns, wherein two holders are required, one for each lantern, and its use is the same as the ordinary slide-holders in present use—that is, while the slide is being shown in one lantern the holder in the other lantern is withdrawn and its slide removed and exchanged for another and the holder replaced in the lantern, each slide to be displayed in turn, and so on at the will of the operator.

The invention therefore consists in novel means of construction and combinations and arrangement of parts, as will be more fully hereinafter described, and summarized in the claims hereunto appended.

Referring to the drawings, Figure 1 is a plan view of my improved holder for lantern-slides, showing a slide in position and in dotted lines the clamping-jaws in normal position. Fig. 2 is a bottom plan of the metal plate, showing the operating mechanism thereof. Fig. 3 is a transverse section on line 2 2, Fig. 2. Fig. 4 is a section taken on line 1 1 of Fig. 1, showing one of the clamping-jaws and the thumb operating device.

Heretofore great difficulty has been experienced in correctly registering the slide in a holder when placed in an optical instrument on account of the slides being made of various dimensions. The holder registers the slide and brings the picture, which is usually about three inches square, into optical line in the lantern, it being the same size as the wood frames now in use, in which colored slides are usually mounted. The stop upon the lantern necessarily will cause all the frames or holders to register alike. The slide is placed in a rectangular recess or slide-space made in the side of and on the outside of the holder and is of sufficient size to admit of the largest regular-size slide. The slide is not inserted as in all other holders, but is laid flatwise in this space and against the metal plate. The recess or slide-space is formed by building up around the slide-space of sufficient thickness to protect the slide when the holder is placed in the lantern. To prevent the slide from falling out when held vertically or placed in the lantern, two clamping-jaws, hereinafter described, actuated by a spring, press against the ends of the slide and hold it firmly. These jaws working in unison bring the slide to the center of the holder and the picture directly over the exposing-opening. This exposing-opening is the same as in all slide-holders, which permits the light to pass through, and with it the picture, to the screen.

The holder is preferably made of wood and consists of two sections A A'. Section A is provided with a hollow receptacle, wherein the operating parts of the registering device are concealed. The section A', which for the sake of convenience I term the "top," is securely fastened to the bottom section A by means of screws or otherwise and with it the plate B, which is preferably made of metal, the whole thus forming a compact holder which is simple, economical, and easily constructed.

B represents a metal plate on the under side of which is provided the mechanism for registering the slide, and is placed upon and covers section A of the holder, and is provided with the usual exposing-opening $b$, the same size as opening $a$ of section A. As shown, plate B is provided with two upstanding flanges $b'$ $b^2$ at its cut-away central portion and also two similar flanges $b^3$ $b^4$, which are bent parallel to the plate A, as shown, to form guides, these flanges also strengthening the plate B.

The mechanism for holding and registering the slide is constructed as follows: The slide is held by two clamping-jaws C C', situated in the sides of the rectangular recess or slide-space $b$. The jaws C C' are preferably made straight for a portion of their length and then bent upwardly and inclined toward the slide at an angle greater than a right angle. The jaws are preferably curved, as shown, for the purpose of permitting either end of a slide to be passed up or down between them, whereby slides that are not matted square may appear so when the picture is displayed upon the screen.

Conveniently situated near one end of the holder, upon section A' and in line with the clamping-jaws, is a thumb-piece D, which operates the jaws and is contained in a recess or cut-away portion F of the part A'. This thumb-piece is for opening or expanding the clamping-jaws.

The jaws C C' and thumb-piece D are connected with two L-shaped pieces G G'. Suitable openings E E are made in the plate B at the sides of opening $b$ for the purpose of permitting access to the thumb-piece D for operating the jaws. The longer arms of pieces G G' are respectively connected to sliding bars $g$ $g'$, preferably of metal, which are adapted to work in guides at the side of opening $b$, which guides are formed by the overlapping edges of the flanges $b^3$ $b^4$ of the plate B. The bars $g$ $g'$ may be connected by riveting or otherwise to the shorter arms $g^2$ $g^3$ of the L-shaped pieces. The sliding bars $g$ $g'$ are connected to each other by means of a swinging lever H, which is centrally pivoted at one end of the plate A by means of a pin, upon which the lever rotates. At the outer ends of this lever are provided openings $h$ $h'$, adapted to engage studs or projections $h^2$ $h^3$ on the sliding bars $g$ $g'$.

Two wire springs J J' are respectively fastened in bearings $j$ $j'$ at opposite ends of plate A. As shown, the spring J has its outer end resting in the socket $j^2$ of an upstanding flange of bar $g$. Spring J' has its outer end resting against the upstanding flange of the bar $g'$ at the point $j^3$.

In practice it will be noticed when the holder is taken in the hand that the thumb-piece is conveniently near the thumb, and by pressing the thumb-piece the clamping-jaws are caused to expand and permit the slide to be placed in the recess or slide-space and between the clamping-jaws and over the exposing-opening. The clamping-jaws may be expanded from their normal position of about three inches to more than four inches apart, or sufficient to permit the largest slide to be placed in the recess or slide-space. Provision for this expansion and contraction is made by having the opening E in metal plate, through which the clamping-jaws connect with the mechanism under the plate. The thumb-piece and nearest clamping-jaw are made of one piece of metal, the ends being upturned, one side forming a clamping-jaw and the other the thumb-piece. The bottom of upright part is riveted to a sliding bar which is partly to guide the thumb-piece and clamping-jaw and to afford means to connect with the other clamping-jaw, as it is found convenient to have both clamping-jaws expanded from one convenient point—namely, the thumb-piece. Both sliding bars being connected by a swinging lever necessarily cause the jaws C C' to operate in unison by means of the thumb-piece, as above described. Obviously the action of the springs pressing upon the ends of the sliding bars will necessarily cause the clamping-jaws to close upon and grip the slide in proper position, and in so doing the slide will be firmly held and the instrument will become self-registering.

It is obvious that in practice I may so change some of the working parts of the holder without departing from the essence of the invention that equally as good results will be produced.

Having thus described my invention, what I therefore claim as new, and desire to secure by Letters Patent thereon, is—

1. In a device of the kind described the combination in a holder consisting of two sections each provided with an exposing-opening so constructed as to form a recess or slide-space on one of said sections, a plate located intermediate said sections having an exposing-opening, and slide-clamping mechanism on one surface of said plate and incased in one of said sections, for the purpose and substantially as described.

2. In a slide-holder, the combination of two sections each of said sections having a rectangular opening, a plate located between the sections of said holder also having a rectangular opening, of a pair of synchronously-operating clamping-jaws located on opposite sides of said rectangular opening, substantially as described.

3. The combination in a sectional slide-holder, of a plate located between the sections of said holder, a recess formed in said sections and plate, and a pair of inclined clamping-jaws located on opposite sides of the exposing-opening of said recess, adapted to engage a slide by its edge whereby the slide is securely held against said plate, thereby bringing the slide to an accurate parallel plane with the lenses of an optical lantern, substantially as described.

4. The combination in a holder for lantern-slides, of a recess formed in said holder, a pair of synchronously-acting clamping-jaws arranged opposite to each other within said recess; with a thumb-piece connected to one of said clamping-jaws for expanding the latter, and means for simultaneously controlling the movement of said jaws, substantially as described.

5. The combination in the plate for the purpose described, having the sides opposite the exposing-opening bent at right angles respectively, and adapted to strengthen the plate, the two other sides inclosing such exposing-opening having their edges bent parallel to the plate to form guides; a pair of clamping-jaws; openings E cut in the plate on opposite sides of the exposing-opening for connecting the clamping-jaws, and mechanism on said plate for operating said clamping-jaws, as and for the purpose described.

6. The combination in a holder having a recess or slide-space formed therein, of clamping-jaws arranged oppositely within said recess, a thumb-piece rigidly attached to one of said clamping-jaws, a plate located intermediate said holder, and provided with necessary openings substantially as described, sliding bars operating on said plate, and a lever centrally and pivotally connected to said plate near one end thereof and to the ends of said sliding bars whereby when the thumb-piece is operated the clamping-jaws are simultaneously caused to operate, substantially as described.

7. The combination in a slide-holder for optical lanterns, of a plate, springs rigidly attached by one of their ends to opposite parts of the plate, a lever centrally pivoted near one end of the plate, sliding bars having studs or projections to receive the opposite ends of the lever, and clamping-jaws operated in unison through the sliding bars, substantially as described.

8. The combination in a holder, of a plate located intermediate said holder, of the sliding bars arranged longitudinally of said plate, a pivoted lever, clamping-jaws forming part of said sliding bars and connected by said lever, and a thumb-piece for expanding the clamping-jaws; with springs adapted to engage the ends of said sliding bars whereby the clamping-jaws are caused to close, substantially as described.

9. In a device of the kind described, the combination of a plate, a pair of sliding bars arranged and operated upon said plate, substantially as described, of the clamping-jaws, springs located near the ends of said plate, and projections on one end of each of said sliding bars adapted to retain said springs, whereby when the jaws are expanded they will close automatically by the action of said springs, substantially as described.

In testimony that I claim the foregoing as my own I affix my signature in the presence of two witnesses.

HORACE W. FORCE.

In presence of—
   JAMES R. MANSFIELD,
   ALEX. SCOTT.